US009540224B2

(12) United States Patent
Hakansson et al.

(10) Patent No.: US 9,540,224 B2
(45) Date of Patent: Jan. 10, 2017

(54) FLUID METER WITH IMPROVED PISTON GUIDANCE

(71) Applicant: Wayne Fueling Systems Sweden AB, Malmo (SE)

(72) Inventors: Marie Hakansson, Malmo (SE); Bengt I. Larsson, Skivarp (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 0 days.

(21) Appl. No.: 15/146,184

(22) Filed: May 4, 2016

(65) Prior Publication Data

US 2016/0244316 A1    Aug. 25, 2016

Related U.S. Application Data

(63) Continuation of application No. 14/948,706, filed on Nov. 23, 2015, now Pat. No. 9,360,359, which is a
(Continued)

(51) Int. Cl.
*G01F 7/00* (2006.01)
*B67D 7/18* (2010.01)
(Continued)

(52) U.S. Cl.
CPC . *B67D 7/18* (2013.01); *B67D 7/04* (2013.01); *F04B 1/02* (2013.01); *F04B 53/006* (2013.01);
(Continued)

(58) Field of Classification Search
CPC ............... G01F 1/74; G01F 3/12; G01F 1/00; G01F 3/18; G01F 3/16; B67D 7/166; B67D 7/18
(Continued)

(56) References Cited

U.S. PATENT DOCUMENTS 1,331,159 A * 2/1920 Lambert ................... G01F 1/10
                                                                73/197
2,756,726 A * 7/1956 Ainsworth ............... B67D 7/18
                                                                91/180
(Continued)

FOREIGN PATENT DOCUMENTS

CN      1450342 A      10/2003
WO      9849530 A1     11/1998

OTHER PUBLICATIONS

Chinese Office Action for CN Application No. 201080070997.8, dated Feb. 8, 2014.
(Continued)

*Primary Examiner* — Lisa Caputo
*Assistant Examiner* — Nigel Plumb
(74) *Attorney, Agent, or Firm* — Mintz Levin Cohn Ferris Glovsky and Popeo, P.C.

(57) ABSTRACT

The invention relates to a fluid meter (27) comprising a housing (28) defining at least one crankcase (29) and two cylinders (25, 26), a crankshaft (11) disposed in the crankcase (29), two pistons (3, 4) respectively mounted in the cylinders (25, 26) for reciprocal movement, a first connecting rod (12) connected to one of the pistons (3) and to the crankshaft (11) for rotating the crankshaft (11) in response to the movement of the one piston (3), and a second connecting rod (13) connected to the other piston (4) and to the crankshaft (11) for rotating the crankshaft (11) in response to the movement of the other piston (4), wherein the first and second connecting rods (12, 13) have yoke slots (16, 17) for receiving a crank pin (19) radially offset from the crankshaft (11). The invention is characterized in that the first connecting rod (12) has a guiding rod (20) extending in a longitudinal direction of the cylinders, the guiding rod (20) being adapted to engage a corresponding cavity (22) in the second connecting rod (13) to support and guide the connecting rods
(Continued)

(12, 13) in relation to each other during movement. The invention further relates to a multiple fluid meter assembly (61) comprising at least two fluid meters (27) as defined above, and to a fuel dispensing unit comprising a fluid meter (27) or a multiple fluid meter (61) as defined above.

22 Claims, 6 Drawing Sheets

Related U.S. Application Data continuation of application No. 13/976,371, filed as application No. PCT/EP2010/070810 on Dec. 28, 2010, now Pat. No. 9,222,818.

(51) Int. Cl.

| | |
|---|---|
| *G01F 1/74* | (2006.01) |
| *G01F 3/18* | (2006.01) |
| *G01F 3/16* | (2006.01) |
| *B67D 7/04* | (2010.01) |
| *F04B 1/02* | (2006.01) |
| *F04B 53/00* | (2006.01) |
| *F04B 53/14* | (2006.01) |
| *F04B 53/16* | (2006.01) |

(52) U.S. Cl.
CPC .............. *F04B 53/147* (2013.01); *F04B 53/16* (2013.01); *G01F 1/74* (2013.01); *G01F 3/16* (2013.01); *G01F 3/18* (2013.01)

(58) Field of Classification Search
USPC .......... 73/195, 272 R, 861, 247, 248; 48/180
See application file for complete search history.

(56) References Cited

U.S. PATENT DOCUMENTS

| | | | | |
|---|---|---|---|---|
| 4,526,032 | A * | 7/1985 | Hu/ ster | G01F 3/18 |
| | | | | 73/245 |
| 5,099,697 | A * | 3/1992 | Agar | G01F 1/74 |
| | | | | 73/195 |
| 5,648,606 | A * | 7/1997 | Spalding | G01F 3/18 |
| | | | | 73/247 |
| 5,686,663 | A | 11/1997 | Spalding | |
| 5,811,676 | A * | 9/1998 | Spalding | B67D 7/18 |
| | | | | 73/197 |
| 5,886,663 | A * | 3/1999 | Broxon, II | G01S 7/4052 |
| | | | | 342/165 |
| 7,647,951 | B2 * | 1/2010 | Larsson | B67D 7/048 |
| | | | | 141/290 |
| 8,322,208 | B2 * | 12/2012 | Hakansson | G01F 3/18 |
| | | | | 73/247 |
| 8,347,708 | B2 * | 1/2013 | Hakansson | G01F 3/18 |
| | | | | 73/247 |
| 8,353,207 | B2 * | 1/2013 | Hakansson | G01F 3/18 |
| | | | | 73/247 |
| 8,430,429 | B2 * | 4/2013 | Larsson | B67D 7/0478 |
| | | | | 141/279 |
| 8,512,011 | B2 * | 8/2013 | Larsson | B67D 7/04 |
| | | | | 417/418 |
| 9,222,818 | B2 * | 12/2015 | Hakansson | B67D 7/18 |
| 9,372,662 | B2 * | 6/2016 | Hakansson | B67D 7/18 |

OTHER PUBLICATIONS

International Search Report for Application No. PCT/EP2010/070810, dated Aug. 3, 2011.

\* cited by examiner

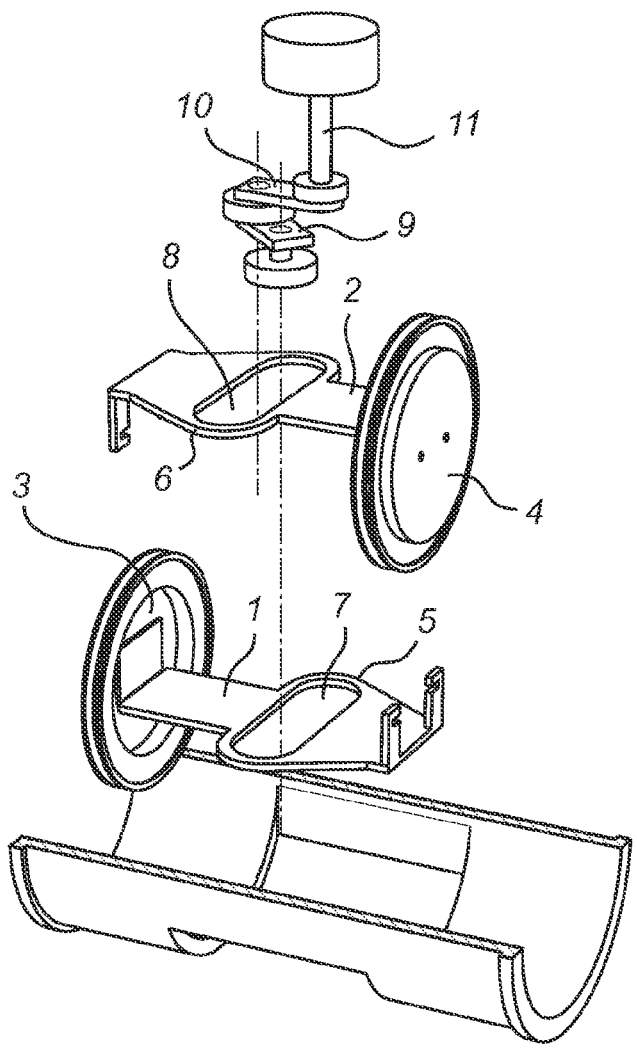
(Prior art) *Fig. 1a*
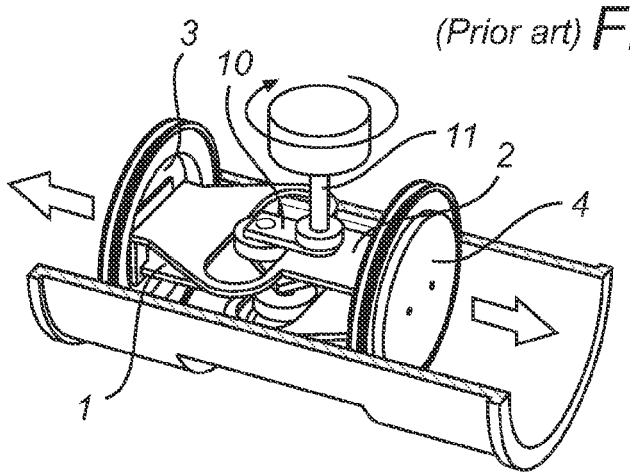
(Prior art) *Fig. 1b*

FLUID METER WITH IMPROVED PISTON GUIDANCE

CROSS REFERENCE TO RELATED APPLICATIONS

The present application is a continuation of U.S. application Ser. No. 14/948,706, filed Nov. 23, 2015, and entitled "Fluid Meter with Improved Piston Guidance," which is a continuation of U.S. application Ser. No. 13/976,371, filed Jun. 6, 2013, and entitled "Fluid Meter with Improved Piston Guidance," which is a national stage application pursuant to 35 U.S.C. §371 of PCT Application No. PCT/EP2010/070810, filed Dec. 28, 2010, and entitled "Fluid Meter with Improved Piston Guidance," which are hereby incorporated by reference herein in their entireties.

TECHNICAL FIELD

The present invention relates generally to a fluid meter for volume measurement of a flowing fluid. More particularly, the present invention relates to a fluid meter as defined in the introductory part of claim 1, a multiple fluid meter assembly as defined in claim 11, and a fuel dispensing unit as defined in claim 14.

BACKGROUND ART

Fluid meters are widely used for most kinds of fluids in different application areas. Fluid meters are for example used in fuel dispensing pumps for retail sale of motor fuel, providing a means for measuring the quantity dispensed from the pump. The measured volume is typically communicated to a register, displaying the dispensed volume and the price.

A fluid meter commonly used for fuel dispensers is shown by Ainsworth, U.S. Pat. No. 2,756,726. In this disclosure a meter having a multiple piston hydraulic motor is used. Fluid is allowed to enter cylinders and cause reciprocation of the pistons. The pistons are connected to a shaft, that will rotate as an effect of the reciprocation. A rotary valve, coupled to the shaft, admits liquid to the cylinders or permits flow to the outlet connections, in proper timed relation. The fluid meter utilizes what may be termed "hypothetical" cylinders, mechanically and hydraulically cooperating with the cylinders and pistons which are structurally existent.

This is accomplished by arranging the ports and the rotary valve so as to sequentially admit fluid to both the crankcase and the ends of the cylinders at the same time as fluid is withdrawn from the cylinders. The fluid volume admitted to, or withdrawn from, the crankcase is the algebraic sum of the volume withdrawn from, or admitted to, the cylinders. Two pistons, actuated through the valve mechanism, advantageously 120 degrees out of phase, thus perform the work equivalent of three pistons. This reduces the actual number of cylinders required for a given capacity, reduces internal friction and pulsation, and achieve smoother operation. The two pistons are attached via connecting rods to a crankshaft with a radially offset crank pin. The crank pin engages a yoke in each connecting rod so that the reciprocating movement of the two pistons is transformed into a rotary motion of the crankcase in accordance with the Scotch Yoke type principle. To accomplish the phase differences between the pistons, the two physical cylinders are oriented with an angle of 120 degrees between their respective centre axis.

The Ainsworth fluid meter has several drawbacks, as e.g. the requirement of special piston guide barrels, the arrangement of cylinders and guide barrels is difficult to mould or cast and machine, and the register is driven by a shaft extending through the meter housing with accompanying risk of leakage.

A similar fluid meter is disclosed by Spalding, U.S. Pat. No. 5,686,663 and WO 98/49530. This fluid meter aims at eliminating the drawbacks of the Ainsworth fluid meter. Thus, the two angled cylinders of Ainsworth are aligned along a common centre axis to eliminate the bulky construction of Ainsworth. To accomplish the same piston reciprocity, the crankshaft is modified with an extra crank arm. The in-line construction is advantageous when several meters have to be mounted in one dispenser, which is the normal case in most modern fuel dispensers.

The Spalding fluid meter, however, is not without some drawbacks. The connecting rods that are connected to the pistons and are driven by the crankshaft via two crank arms, have to be guided in some way to keep a straight movement and no wear on the cylinder walls, Spalding has two solutions to that problem. According to the first solution the pistons have guiding rods extending in a direction away from the crank shaft and towards the end of the cylinder. The cylinder end piece has a receiving cavity for the guiding rod to keep the piston and the connecting rod to reciprocate along a straight line. The other solution suggest that a guiding tap is extending from one connecting rod, engaging the other connecting rod to guide the connecting rods in one another.

Both of the solutions for guiding the connecting rods according to Spalding have drawbacks. The first solution has the drawback of using space requiring cavities in the cylinder ends, causing the cylinder length to be increased. The second solution has the drawback of being subject to wear. When the connecting rods are worn measurement accuracy will be affected, which is not acceptable in a dispenser dispensing something as valuable as fuel.

SUMMARY OF THE INVENTION

It is an object of the present invention to improve the current state of the art, to solve the above problems, and to provide an improved fluid meter that is easier to manufacture, more robust, more reliable, and more precise than previous fluid meters. This is solved by using connecting rods that are guided in each other in a way that minimizes wear to the guiding arrangement of the rods, while keeping the size of the connecting rods and guiding arrangement to a minimum.

According to one aspect, the present invention provides a fluid meter comprising a housing defining at least one crankcase and at least two cylinders, a crankshaft disposed in the crankcase, at least two pistons respectively mounted in the cylinders for reciprocal movement, a first connecting rod connected to one of the pistons and to the crankshaft for rotating the crankshaft in response to the movement of the one piston, and a second connecting rod connected to the other piston and to the crankshaft for rotating the crankshaft in response to the movement of the other piston, wherein the first and second connecting rods have yoke slots for receiving a crank pin radially offset from the crankshaft. The fluid meter is characterised in that said first connecting rod has a guiding rod extending in a longitudinal direction of said cylinders, said guiding rod being adapted to engage a corresponding cavity in said second connecting rod to support and guide the connecting rods in relation to each other during movement.

The concept of having a guiding rod that guide the two connecting rods and pistons in the fluid meter cylinders through a solution where the guiding rod is received in a cavity of the other connecting rod has the advantage over the prior state of the art in that it creates a sturdy guiding connection, reducing wobbling or fluctuations sideways in the cylinders. The guiding solution will also suffer much less from wear than previous solutions since fluctuation sideways in the cylinders is reduced. Having the guiding rod along the side of the connecting rod, the cavity of the other rod naturally being placed correspondingly, the guiding arrangement will not affect the length of the connecting rods. The connecting rods can thus be minimized in length which is important to reduce the fluid meter size.

The second connecting rod may have a guiding rod extending in a longitudinal direction of said cylinders, said guiding rod being adapted to engage a corresponding cavity in said first connecting rod. This feature will make it possible to manufacture the two connecting rods as identical pieces, reducing manufacturing costs. It will also create an even more sturdy construction, having the same benefits as discussed above, i.e. reduced sideways movement and reduced wears of the guiding arrangement of the connecting rods.

The cavity of each connecting rod may extend along more than half the length of said connecting rod in its longitudinal direction. Naturally the guiding rod of each one of the connecting rods has a corresponding free length that is equal to the depth of the cavity. The free length is the part of the guiding rod that is not covered by the material of the connecting rod. Since the cavity length and the corresponding guiding rod is long, a relatively large overlap between the guiding rod and the cavity will occur. The overlap is 20-80%, preferably 30-70% and more preferably 40-60% of the length of the connecting rod. The relatively large overlap will enhance the sturdiness of the construction of the rod guiding arrangement and reduce sideways movement and reduce wear. The overlap will of course vary depending on the position of the pistons. But due to the long guiding rod compared to the length of the connecting rod, the overlap will be large also when the connecting rods are as far apart as possible.

The connecting rod may be made of a hard plastic and the guiding rod may be made of metal. The guiding rod may then be moulded into the guiding rod. The connecting rods could however also be made of metal, either moulded or made of a metal sheet, as in the prior art. Making the connecting rods of plastic has the advantage of cheap manufacturing costs and low weight. Low weight will increase the efficiency of the fluid meter since the resistance force that has to be overcome by the fluid to move the pistons will be reduced.

The connecting rods may be connected to the crankshaft by one common crank pin that is radially offset from the crankshaft; an axis through the endpoints of the yoke slot of one connecting rod may form an angle alpha with the alignment axis of the two cylinders; and an axis through the endpoints of the yoke slot of the other connecting rod may form another, different angle beta with said alignment axis, so that the corresponding pistons reciprocate out of phase.

It should, however be noted that the inventive guiding arrangement is equally useful for the traditional yoke arrangement according to the Scotch Yoke principle, where the yokes are oblong having their longitudinal direction perpendicular to the piston movement. As pointed out in the background art section, this will require that either the cylinders are angled 120 degrees to one another or the use of two crank arms.

Using yoke slots that extend along a straight line between the endpoints of the yoke slot is the easiest way to generate piston movement with a motion speed following a harmonic sinus shape. It should however be noted that other shapes of the yoke slots could be used, e.g. where the yoke is bent along a suitable curve. The design of the inlet/outlet valve of the fluid meter casing could e.g. require a special reciprocating piston movement, invoked by the yoke slots, to match its design.

The settings of the yoke slots are arranged so as to cause the pistons to reciprocate out of phase even though the cylinders are aligned along the same centre axis. Using normal transversal yoke slots, such as in the Spalding patent described above, two crank arms are necessary to achieve piston movements that are out of phase in such a geometry. Using the yoke slots according to the invention only one crank arm is necessary. There are several benefits of using only one crank arm for the movement of the pistons. The number of components are reduced, leading to reduced material costs. The manufacturing procedure is simplified leading to cheaper production costs. One single crank arm instead of two leads to a crankshaft assembly that is a more robust and rigid unit. Further, the problem of providing the correct angle between two crank arms is eliminated as there is only one crank arm. Each one of the yoke slots of said two connecting rods may be adapted to extend along a straight line between said endpoints. As mentioned above, this is the easiest way to generate piston movement with a motion speed following a harmonic sinus shape and is therefore preferred at present.

The angles alpha and beta may be chosen so that the pistons reciprocate approximately 60.degree. out of phase.

It is advantageous that the yokes, and thus also the connected pistons, reciprocate approximately 60.degree. out of phase to achieve a smooth operation of the fluid meter. To be able to construct the housing in a simple and fairly symmetric manner, a phasing of the pistons 60.degree. out of phase together with a proper inlet/outlet valve design and a geometry where the cylinders are directed from each other, i.e. 180.degree. angled from one another, will allow the fluid flow to enter and exit the two cylinders and the "hypothetical" cylinder in the crankcase, i.e. in between the reciprocating pistons, one by one in a smooth motion with a phase offset by 120.degree. between the operation of the cylinders.

The angle alpha of the yoke slots of the fluid meter may be less than 90.degree. and the angle beta may be more than 90.degree. More preferably alpha may be approximately 60.degree. and beta may be approximately 120.degree. The latter angle setting will cause the pistons to reciprocate 60.degree. out of phase and the operation of the cylinders will thus be 120.degree. out of phase as preferred due to the 180.degree. angle between the two physically existing cylinders.

Another advantage of using oblique settings of the yoke slots, e.g. with angles as described above, is that manufacturing of the fluid meter is simplified. Not only will the crank shaft be simpler, having only one crank arm and one crank pin, but the setting of the angles creating the out-of-phase piston movements will be made in the manufacturing process of the yoke slots instead of in the mounting of two crank arms on the crank shaft as in the prior art of Spalding.

Accurate and precise formation of the yoke slots is fairly simple to achieve. The yokes and slots can be manufactured by moulding, punching a metal sheet, cutting etc. All of these methods are simple and they do not differ from the way other yokes are manufactured. This means that the manufacturing changes in the production of the yokes that are invoked by the present invention will be very small.

According to the present invention it is further preferred to provide a fluid meter of the above type where ports are defined in the housing in communication with the cylinders and the crankcase, and further comprising a port valve mounted on the crankshaft for rotation therewith and having a plurality of ports for sequentially registering with the ports in the housing for distributing fluid into and from the cylinders and the crankcase to control the movement of the pistons. The port valve as described above will ensure precise volume flow through the cylinders of the fluid meter.

The fluid meter may comprise at least one wheel coupled to the crankshaft and may have at least one magnetic pole, and at least one sensor to detect the influence of the at least one magnetic pole and to generate a signal corresponding to the flow of the fluid into and from the corresponding cylinders and the crankcase.

According to another aspect the present invention provides a multiple fluid meter assembly comprising at least two fluid meters of the above type. Such an assembly will provide a compact design when multiple fluid meters are required.

The at least two fluid meters may be arranged such that their alignment axes are parallel. An assembly with parallel fluid meters will provide a meter assembly that is very compact. This is often an important criteria in modern fluid dispensers, where many fluid meters are required and the fluid dispenser unit design require the internal equipment to be small.

The fluid inlet and the fluid outlet of one fluid meter may communicate with the fluid inlet and the fluid outlet of another fluid meter, respectively, so as to connect the individual fluid meters in parallel.

According to yet another aspect the present invention provides a fuel dispensing unit for refueling vehicles, comprising a fluid meter or a multiple fluid meter assembly of the types described above. The fluid meter or fluid meter assembly according to the present invention is especially suitable for fuel dispensers due to its reliability and accurate measurement capabilities.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein:

FIG. 1a is an exploded diagram of connecting rods having slotted yokes and a crank shaft having two crank arms of a fluid meter according to prior art.

FIG. 1b is a perspective view of a mounted assembly of the prior art of FIG. 1a.

FIG. 2b is a perspective view of a mounted assembly of FIG. 2a.

DETAILED DESCRIPTION OF PREFERRED EMBODIMENTS OF THE INVENTION

FIGS. 1a and 1b shows a pair of connecting rods, 1, 2, according to prior art (U.S. Pat. No. 5,686,663 to Spalding et al), each connected to a piston, 3, 4, as described in the prior art. The connecting rods, 1, 2, have Scotch yoke portions, 5, 6, with oblong yoke slots, 7, 6. The centre axes of the yoke slots are perpendicular to the centre axes of the connecting rods, 1, 2. To move the connecting rods, 1, 2, and thus also the pistons, 3, 4, with a phase difference of 60.degree., as described in the prior art of Spalding, the yoke portions, 5, 6, will have to be driven by different crank arms, 9, 10, of the crankshaft, 11 as depicted in FIGS. 1a and 1b.

Figure 2A:
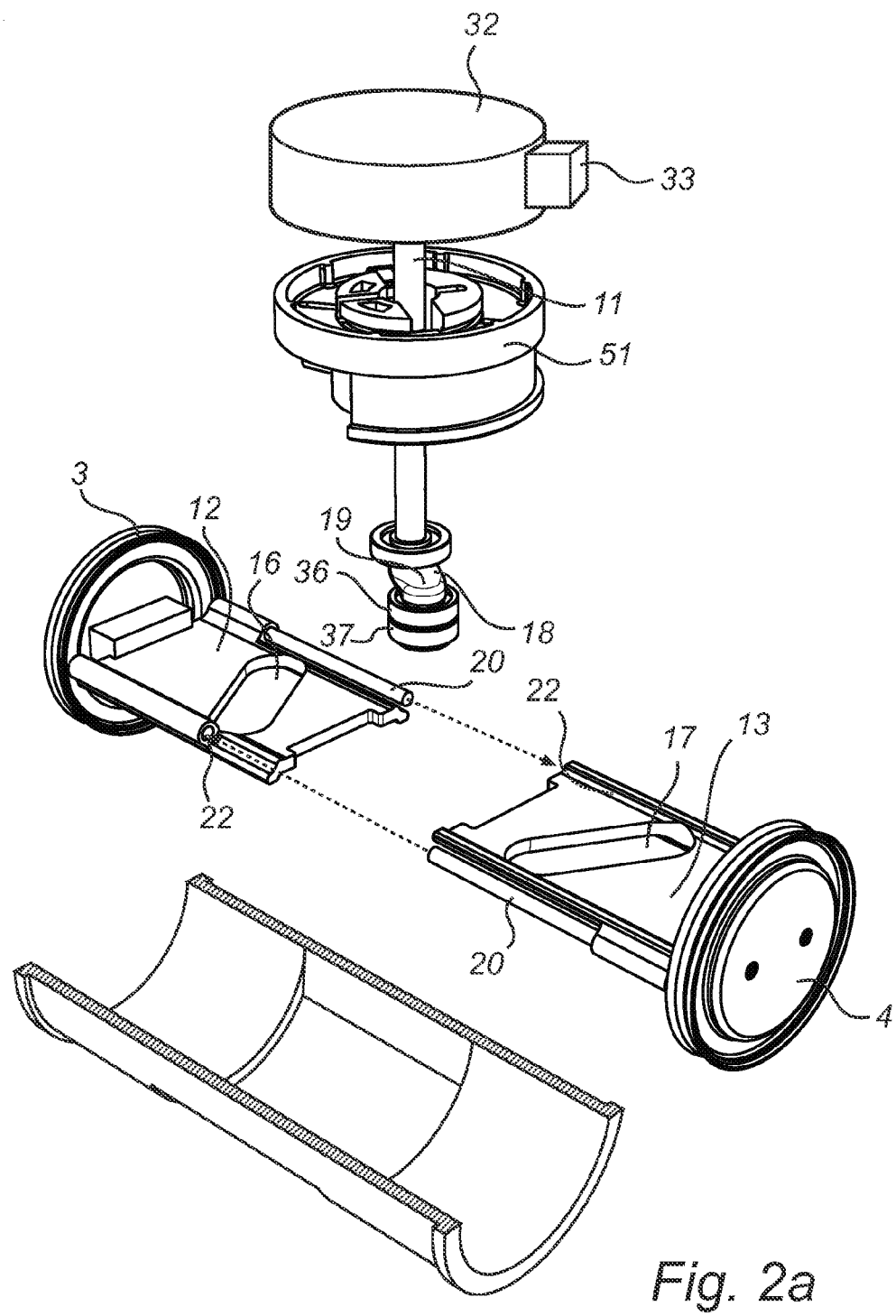
FIG. 2a is an exploded diagram of connecting rods, a crankshaft having one crank arm, a rotating valve, a magnetic wheel and a transducer according a preferred embodiment of a fluid meter according to the present invention.
Figure 2B:
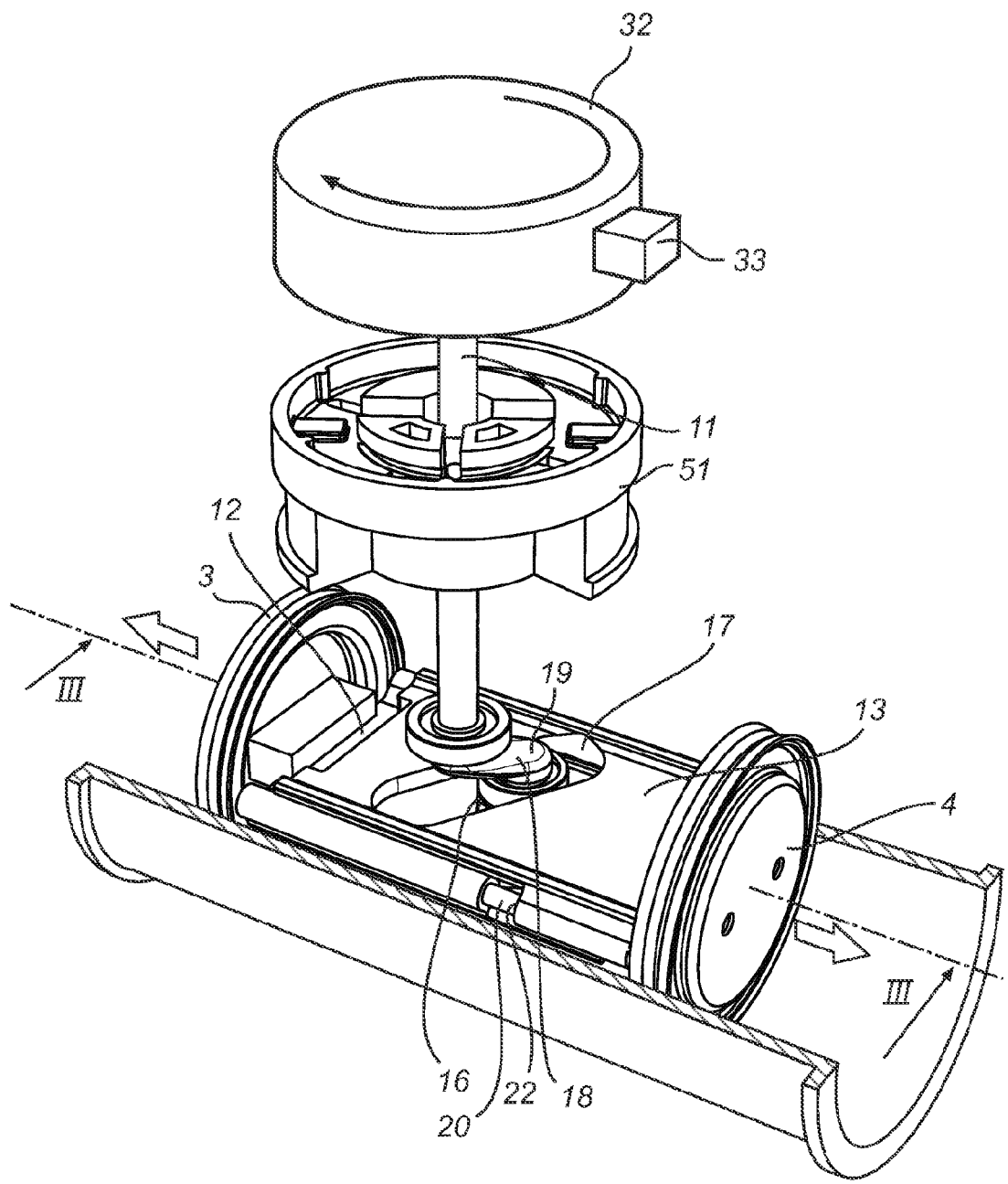

FIGS. 2a and 2b shows the connecting rods 12, 13 of a preferred embodiment of the present invention, the connecting rods 12, 13, having yoke slots 16, 17. The connecting rods 12, 13 are connected by the guiding arrangement according to the present invention. The guiding rod 20 of each connecting rod 12, 13 are engaging the cavity 22 of the other connecting rod. In the embodiment of FIGS. 2a and 2b, the guiding rods 20 are moulded into in the fastening sections 14 of the plastic connecting rods. The cavities 22 naturally has the same length as the free end, i.e. the end that is outside the moulded fastening section 14.

To perform a reciprocating movement of the pistons, 3, 4, using only one crank arm, 18, the centre axes of the oblong yokes slots, 16, 17, are each angled 30.degree. compared to the perpendicular direction to the centre axes of the connecting rods 1, 2. The combined angle between the centre axes of the oblong yoke slots of the two connecting rods, 12, 13, is thus 60.degree. This arrangement of the yoke slots will invoke the same movement of the connecting rods, 12, 13, and thus also the pistons, 3, 4, as the prior art, i.e. a reciprocating movement of the pistons 60.degree. out of phase, but with the use of only one crank arm, 18, and one crank pin, 19.

Figure 3:
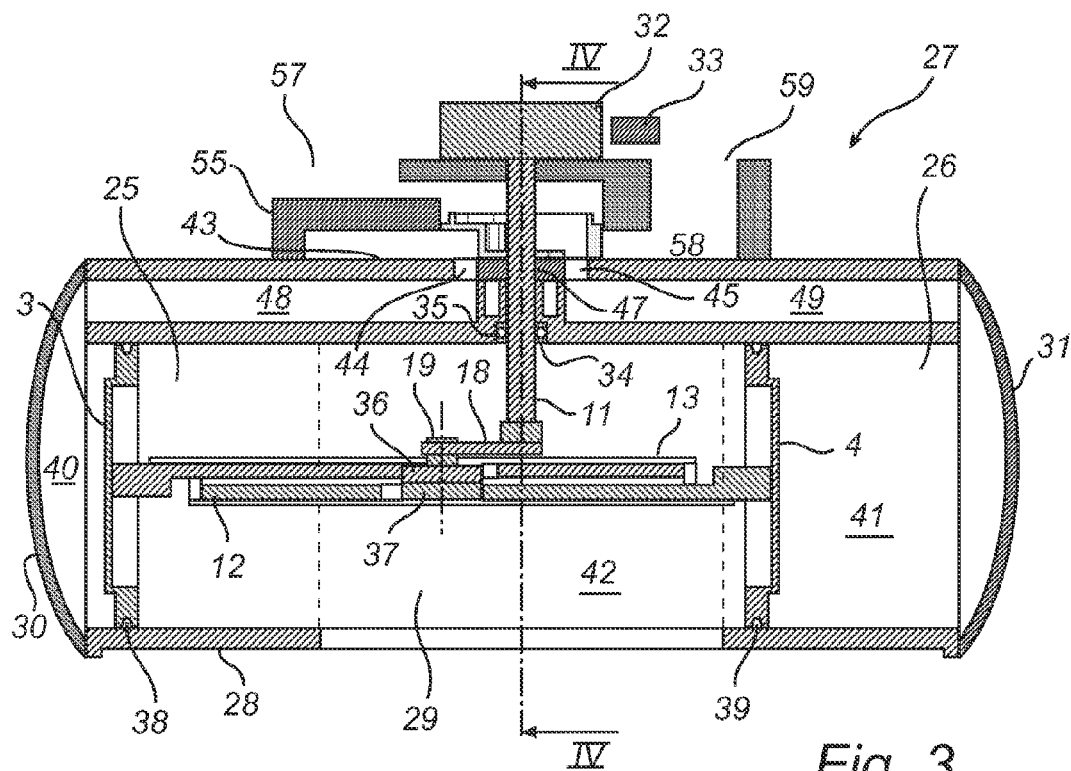
FIG. 3 is a cross sectional view of the fluid meter according to the invention taken along the axis of the aligned cylinders, corresponding to the line III of FIG. 2b.

In FIG. 3 the reference numeral 27 designates a flow meter according to the present invention. The flow meter 27 includes a flow meter body 28 having a crankcase portion 29 (indicated by the broken lines) and opposing, axially aligned, first and second cylinder portions, 25 and 26, respectively, extending outwardly from the crankcase (from the broken lines). The head ends of the cylinder portions 25 and 26 are capped by first and second head end cover plates 30 and 31, respectively.

A magnetic wheel 32 is connected to the crankshaft 11 at the centre of the magnetic wheel 32. A series of magnetic poles (not shown) are incorporated in the magnetic wheel 32 angularly spaced about the outer circumference of the wheel 32.

A Hall effect transducer 33 having two sensors, well known in the art, is mounted within close proximity to the magnetic wheel 32. Due to the proximity of the sensors to the wheel 32, the sensors can detect fluctuations in the magnetic influence of the magnetic poles of the wheel 32 when the wheel 32 rotates. In response to such detection, the transducer 33 generates a pulsed signal proportional to the rate of rotation of the wheel 32. The two sensors are, furthermore, horizontally spaced so that the direction of rotation of the magnetic wheel 32 can be determined by identifying which of the two sensors first detects the magnetic influence of a particular pole.

A ball bearing assembly 34 is fitted in a small bore 35 in the meter body 28. A crankshaft 11 is rotatably disposed in the bearing assembly 34. The crankshaft 11 has a vertical orientation bearing laterally against the bearing assembly 34. The upper portion of the crank shaft 11 extends above the bearing assembly 34 and is shaped to receive a rotary valve more thoroughly discussed with reference to FIGS. 5 and 6 below. A crank arm 18 is connected to the lower portion of the crankshaft 11 and extends radially outwardly from the crankshaft. A crankpin 19 extends downwardly from the radially outer part of the crank arm 18 through a first roller bearing 36 and a second roller bearing 37, the second roller bearing 37 being located below the first roller bearing 36.

Referring to FIG. 3, the flow meter 27 further includes first and second pistons 3, 4, disposed in the cylinders 25 and 26, respectively. First and second connecting rods, 12, 13, drivingly connect the respective pistons 19, 20, to the respective first and second roller bearings, 36, 37. The connecting rods 12, 13 are hence connected to the crankshaft via the roller bearings, 36, 37. The connecting rods 12, 13 are more clearly shown in FIGS. 2a and 2b. The first and second connecting rods, 12, 13 are in this particular embodiment moulded in plastic material having first and second oblong slotted yokes, 16, 17 for slidingly engaging the respective first and second roller bearings, 36, 37. The oblong slotted yokes, 16, 17 do in this embodiment have straight central axes with an angle of 60.degree. between the respective centre axis. The first and second slotted yokes 16, 17, have centre axes with angles of 120.degree. and 60.degree., respectively, to the centre axis of the axially aligned first and second cylinder portions 25 and 26.

The guiding arrangement comprising the guiding rods 20, rigidly fastened in the connection rods at the fastening portion 14, and the cavities 22 corresponding to the guiding rods 20, present a rigid guiding arrangement. As the piston 3 is moved to the left by fluid entering the cylinder volume 40 in the fluid meter, the connecting rod 12 is moved to the left pressing its guiding rod 20 further into the cavity 22 of the other connecting rod 13. The guiding rod 20 of the other connecting rod 13 is naturally correspondingly pressed further into the cavity 22 of the connecting rod 12. Since the guiding rod has a length corresponding to a large portion of the entire length of the connecting rod, the length of the contact are between each of the guiding rods 20 and the corresponding cavities 22 will be large, leading to a stable guidance and low wear.

Referring to FIG. 3, the pistons 3, 4, have circular recesses, 38, 39, for receiving gaskets (not shown). The gaskets are made of a resilient material to seal the cylinder head chambers 40 and 41 from the crankcase chamber 42 defined by the crankcase portion 29 and the parts of the cylinder portions 25, 26 that are on the inner sides (facing the crankcase) of the pistons 3 and 4. The two pistons 3, 4, thus divides the cylinder volumes combined with the crank case portion volume in three chambers, sealed from each other, the head chambers 40, 41 and the crankcase chamber 42.

Figure 4:
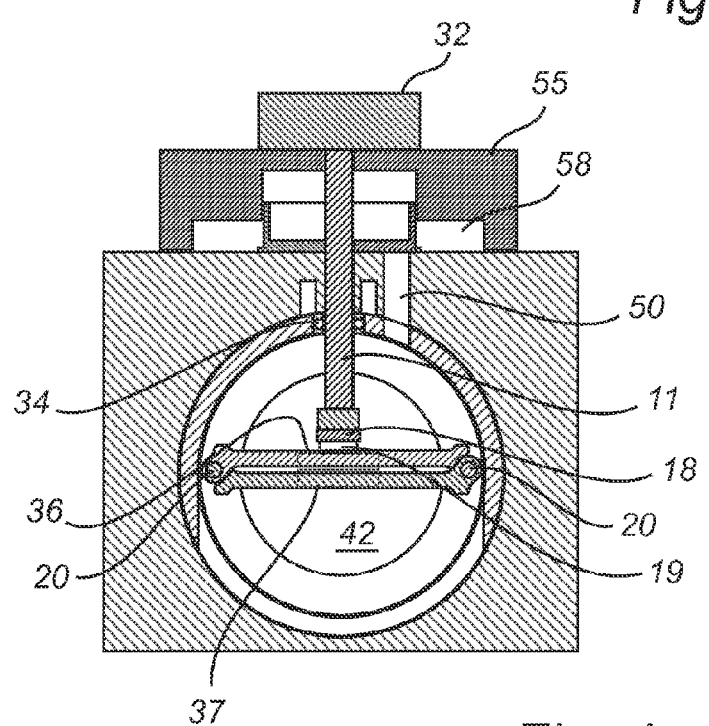
FIG. 4 is a cross sectional view along the line IV in FIG. 3 of the fluid meter according to the invention.
Figure 6:
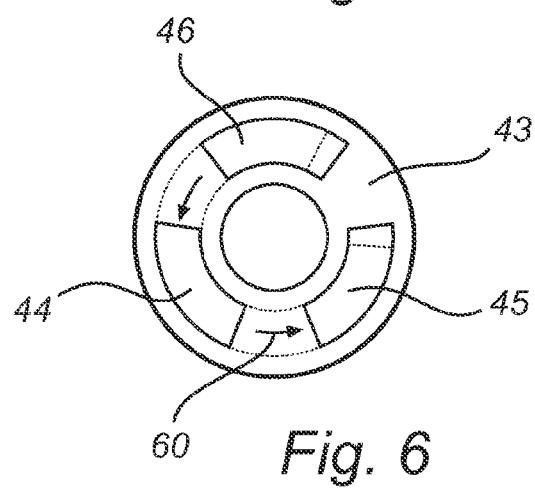
FIG. 6 is a plan view showing the ports of a rotary valve superimposed over a valve seat of the fluid meter in FIG. 3.

FIG. 6 shows the valve seat 43 as seen from the top of the flow meter 27 of FIG. 3. The valve seat 43 includes first, second and third arcuate ports, 44, 45, 46, which each cover an arc about the crankshaft bore 47 of approximately 80.degree. and are angularly spaced apart approximately 40.degree. between ports. Referring to both FIGS. 3 and 6 the first port 44 is in fluid communication with the first head end chamber 40 via a first passageway 48 formed in the fluid meter body 28. The second port 45 is in fluid communication with the second head end chamber 41 via a second passageway 49 formed in the fluid meter body 28. Referring to FIGS. 6 and 4, the third port 46 is in fluid communication with the crankcase chamber 42 via a third passageway 50 formed in the fluid meter body 28.

Figure 5A:
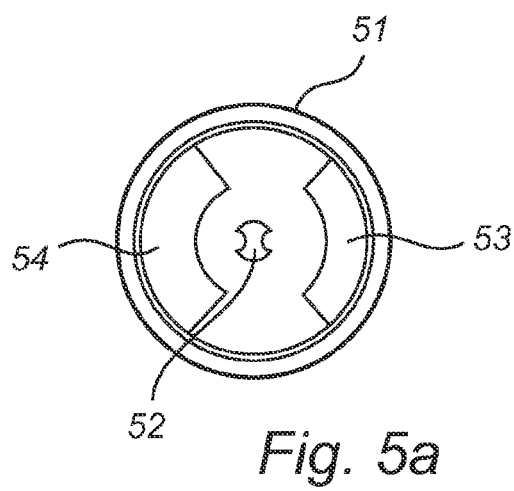
FIG. 5a is a top view of the rotary valve of the fluid meter.
Figure 5B:
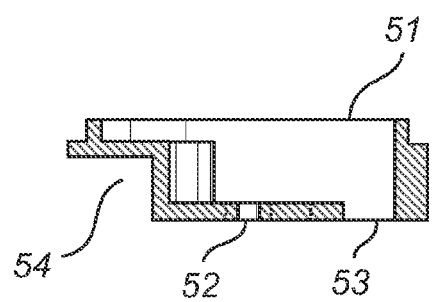
FIG. 5b is a cross sectional view of the rotary valve of the fluid meter according to the invention.

Referring to FIG. 5a, a rotary valve 51 is positioned on top of the valve seat 43 to control the admission and discharge of a fluid into and out of the first, second, and third ports 44, 45, 46. The rotary valve 51, with reference to FIGS. 5a and 5b, includes a hole 52 formed in the center thereof through which the crankshaft 11 extends for rotatably coupling the valve 51 to the crankshaft 11. Referring to FIGS. 5 and 6, the rotary valve 51 further includes an arcuate inlet port 53 and an arcuate outlet port 54 axially and radially aligned to alternately register with the first, second, and third arcuate ports 44, 45, 46 of the valve seat 43 when the valve 51 is rotated by the crankshaft 11. The ports 53, 54 each cover an arc about the hole 52 of approximately 100.degree. and are angularly spaced apart approximately 80.degree. between ports.

As further shown in FIGS. 3 and 4, a mounting flange (or meter dome) 55 is secured to the top of the flow meter body 28. A supply chamber 56 is formed in the flange for supplying fluid to the inlet port 53 of the rotary valve 51. A supply port 57 formed in the flange provides fluid communication between the supply chamber 56 and fluid supply lines (not shown). Similarly, an annular discharge chamber 58 is formed in the flange 55 for receiving fluid discharged from the outlet port 54 of the rotary valve 51. A discharge port 59 provides fluid communication between the discharge chamber 58 and fluid discharge lines (not shown).

FIG. 6 further depicts one instantaneous position of the rotary valve ports 53, 54 (shown in phantom) superimposed over the first, second, and third ports 44, 45, 46 of the valve seat 43. In operation, the rotary valve 51 is rotated by the crankshaft 11 in a counterclockwise direction as indicated by the arrow 60. Accordingly, the inlet and outlet ports 53, 54 sequentially register with each of the ports 44, 45, 46. As shown in FIG. 6, the inlet port 53 is registered with the third port 46 and the outlet port 54 is registered with the second port 45. Registration of the inlet port 53 with the first port 44 is depicted as impending. Because each of the ports 44, 45, 46 cover an angle of approximately 80.degree. and each of the rotary valve ports 53, 54 cover an angle of approximately 100.degree., each port 44, 45, 46 alternately registers with the inlet port 53 for 180.degree. of rotation of the crankshaft 1 and then with the outlet port 54 for 180.degree. of rotation. It can be appreciated that the inlet port 53 or the outlet port 54 may register with one or two, but not all three, of the ports 44, 45, 46 simultaneously. The ports 44, 45, 46 may, however, register with only one of the ports 53, 54 at a time.

To more fully illustrate the operation of the flow meter 27, and with reference to FIG. 3, it will be assumed that, initially, the flow meter body 28 is filled with fluid, the crankshaft 11 is rotated to place the first piston 3 in as close proximity to the head cover 30 as possible (i.e., a "top dead centre" position), the second piston 4 leads the first piston 3 by a phase angle of 60.degree., and the rotary valve ports 53, 54 are related to the first, second, and third ports 44, 45, 46 as shown in FIG. 6 a fluid, such as gasoline from an external source (not shown), is then supplied through the supply port 57 and passed through the supply chamber 56, the inlet port 53 of the rotary valve 51, and, in accordance with FIG. 6, through the third port 46. The fluid then flows through the third passageway 50 (FIG. 4) and into the crankcase chamber 42 where it applies pressure to displace the second piston 4 outwardly (away from the crankshaft 11). The first piston 3 resists outward movement since it is in a top dead centre position. The outward movement of the second piston 4 expels fluid from the second chamber 41 thereby causing the fluid to pass through the second passageway 49, the outlet port 54 of the rotary valve 51, the discharge chamber 58, and out through the discharge port to 59 to a discharge line (not shown). The movement of the second piston 4 also drives the crankshaft 11 via the second connecting rod 13. Accordingly, the crankshaft 11 imparts counter clockwise rotation to the rotary valve 51 and the inlet port 53 begins to register with the first port 44. Fluid in the supply chamber 48 then begins to flow through the inlet port 53 of the rotary valve 51 and through the first port 44. The fluid then flows through the first passageway 48 into the first chamber 40 and applies pressure to displace the first piston 3 inwardly (towards the crankshaft 11), thereby effecting further rotation of the crankshaft 11 and the rotary valve 51. The process continues according the principles described herein. As a result, the pistons 3, 4 reciprocate in the cylinders 25, 26, respectively, thereby rotating the crankshaft 11, the attached rotary valve 51, and the magnetic wheel 32. The sensors in the Hall effect transducer 33 detect the consequent fluctuation in the magnetic influence of the magnetic poles on the wheel 32 and generate a pulsed signal which is proportional to the flow rate of the fluid passing through the flow meter 27. Although not clear from the drawings, it is understood that the pulsed signal may be employed to drive an electronic counter and indicator for recording the volume and total value of fluid, such as gasoline, dispensed through the flow meter 27.

The inlet and outlet ports 53, 54 of the rotary valve 51 and the ports 44, 45, 46 cooperate such that the volume of fluid admitted to, or withdrawn from, the crankcase chamber 42 is equal to the algebraic sum of the volume respectively withdrawn from, or admitted to, the head end chambers 40, 41. Thus the crankcase chamber 42 provides what may be termed a "blind" or "hypothetical" piston and cylinder, mechanically and hydraulically cooperating with the pistons 3, 4 which are structurally existent. Thus the meter operates hydraulically and mechanically like a three piston meter or hydraulic motor although it only has the physical components of a two piston meter or motor. It should be noted that the flow into and out of the flow meter 27 is substantially constant. This constant flow results from reciprocating the axially-aligned pistons 3, 4 60.degree. out of phase and from utilizing yokes 16, 17 as described above, which are substantially harmonic in conformity with Scotch Yokes.

Thus, as a result of all of the foregoing, the fluid meter of the present invention is compact, yet cost-efficient and mechanically efficient.

It is understood that the yoke slots of the invention, could have other shapes. The yokes could e.g. be curved to accomplish a perfect sine function movement or any modification of a periodic sine function.

Figure 7:
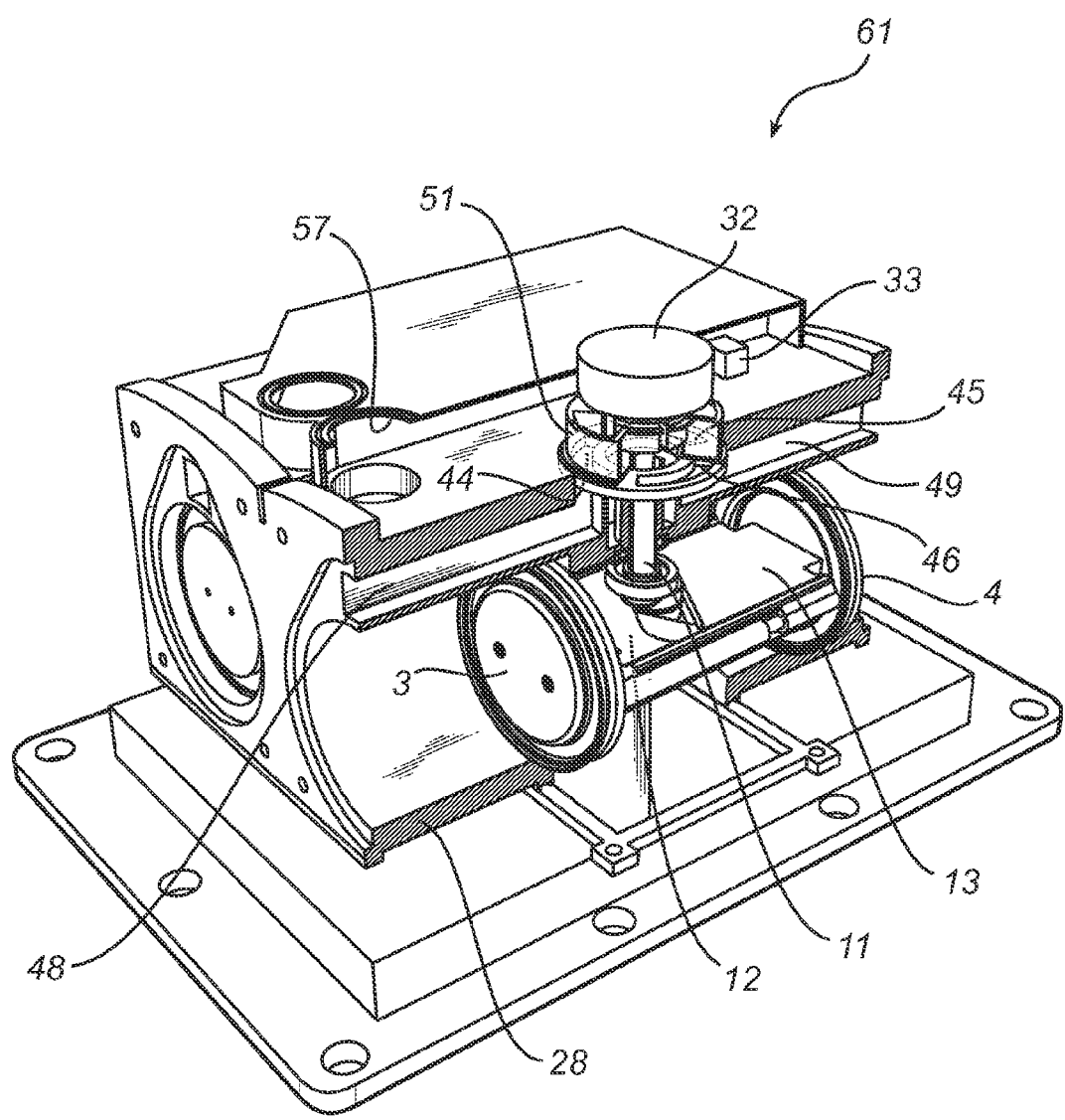
FIG. 7 is an isometric view of a unitary assembly incorporating two fluid meters similar to the meter of FIGS. 1-6.

It is further understood that multiple flow meters 27 may be integrated into a single assembly to gain several advantages over the single flow meter described hereinabove. For example, a duplex flow meter assembly 61 wherein two fluid meters 27, as depicted in FIG. 7, are integrated together, would facilitate the construction of gasoline dispenser pump stations having two, four, six, or eight gasoline dispensers. Furthermore, a duplex flow meter 61 would only require a single meter body, meter dome, and end cover, thereby economizing on manufacturing costs. Installation of duplex flow meters 61 is facilitated as a result of simplified mounting and pipe work and the reduced cabinet size required to house a duplex fluid meter. Flexibility is also enhanced because a duplex flow meter could also serve a single hose outlet at twice the speed of delivery of a single unit flow meter.

It is further understood that the ports 44, 45, 46, 53, 54 may cover arcs of a number of different angles and, moreover, may have non-arcuate shapes.

It is still further understood that the supply port and the discharge port may instead be utilized as discharge and supply ports respectively. Furthermore, the supply and discharge lines connected thereto may be arranged for measuring the volume of any fluid that flows through any line. For example, in addition to measuring a fluid, such as gasoline, that flows from a dispenser, the meter could be used to measure the volume of water flowing from a pipe into a structure such as a residential house or other building.

It is understood that other variations in the present invention are contemplated and in some instances, some features of the invention can be employed without a corresponding use of other features. Accordingly, it is appropriate that the appended claims be construed broadly in a manner consistent with the scope of the invention.

What is claimed is:

1. A method for driving a fluid meter, comprising:
delivering fluid to first and second cylinders such that the fluid causes reciprocal motion of a first piston of the first cylinder and a second piston of the second cylinder, wherein a single crankshaft having a single crank arm with a single crank pin extends through an oblong slot in a first piston arm of the first piston and through an oblong slot in a second piston arm of the second piston such that movement of the pistons is effective to cause rotation of the crankshaft via the single crank pin and the single crank arm.

2. The method of claim 1, wherein the at least two cylinders are positioned opposite to each other and are longitudinally aligned with one another such that the cylinders move along a common longitudinal axis.

3. The method of claim 1, wherein a longitudinal axis of the crank pin is radially offset from a longitudinal axis of the crankshaft.

4. The method of claim 1, wherein the crank pin is coupled to a first roller bearing and a second roller bearing such that the first and second roller bearings drivingly connect connecting rods of the first and second cylinders to the crank pin.

5. The method of claim 1, wherein the first piston arm has a guiding rod that engages a corresponding cavity in a connecting rod of the second piston arm to support and guide the piston arms in relation to each other during movement.

6. The method of claim 5, wherein the cavity receives at least about 30% of a length of the guiding rod.

7. The method of claim 5, wherein the cavity receives at least about 40% of a length of the guiding rod.

8. The method of claim 1, wherein the first cylinder includes a first piston and a first piston arm, and the second cylinder includes a second piston and a second piston arm, the first and second piston arms being slidably coupled to one another.

9. The method of claim 8, wherein the second piston arm has a guiding rod that engages a corresponding cavity in a connecting rod of the first piston arm to support and guide the piston arms in relation to each other during movement.

10. The method of claim 1, wherein the first piston has at least one connecting rod that is formed from a plastic and that is molded around at least one guiding rod of the second piston.

11. The method of claim 10, wherein the at least one guiding rod of the second piston is formed from a metal.

12. The method of claim 11, wherein the first and second cylinders are positioned opposite to each other and are longitudinally aligned such that the first and second cylinders move along a common longitudinal axis.

13. The method of claim 11, wherein a longitudinal axis of the crank pin is radially offset from a longitudinal axis of the crankshaft.

14. The method of claim 11, wherein the crank pin is coupled to a first roller bearing and a second roller bearing, the oblong slot in each of the first and second cylinders causing rotation of the crankshaft via the roller bearings on the crank pin.

15. The method of claim 14, wherein the first piston arm has a guiding rod that engages a corresponding cavity in a connecting rod of the second piston arm to support and guide the piston arms in relation to each other during movement.

16. The method of claim 11, wherein the first cylinder includes a first piston and a first piston arm, and the second cylinder includes a second piston and a second piston arm, the first and second piston arms being slidably coupled to one another.

17. The method of claim 16, wherein the cavity receives at least about 30% of a length of the guiding rod.

18. The method of claim 16, wherein the cavity receives at least about 40% of a length of the at least one guiding rod.

19. The method of claim 16, wherein the second piston arm has a guiding rod that engages a corresponding cavity in a connecting rod of the first piston arm to support and guide the piston arms in relation to each other during movement.

20. The method of claim 19, wherein the at least one guiding rod of the second piston is formed from a metal.

21. The method of claim 11, wherein the first piston has at least one connecting rod that is formed from a plastic and that is molded around at least one guiding rod of the second piston.

22. A method for driving a fluid meter, comprising:
delivering fluid through a housing such that the fluid causes reciprocal movement of first and second cylinders disposed within the housing, the first and second cylinders each including an oblong slot formed therein that is coupled to a single crank pin of a crank arm on a crank shaft such that the reciprocal movement of the first and second cylinders is effective to cause rotation of the crankshaft via the single crank pin and the single crank arm.

* * * * *